US012799746B2

(12) United States Patent
Jaudouin et al.

(10) Patent No.: US 12,799,746 B2
(45) Date of Patent: Nov. 17, 2026

(54) MULTILAYER STRUCTURE FOR THE CREATION OF REINFORCED AND RECYCLABLE FLOORING

(71) Applicant: GERFLOR, Lyons (FR)

(72) Inventors: Olivier Jaudouin, Sourcieux les Mines (FR); Nicolas Cinausero, Fontaines Saint Martin (FR)

(73) Assignee: GERFLOR, Lyons (FR)

( * ) Notice: Subject to any disclaimer, the term of this patent is extended or adjusted under 35 U.S.C. 154(b) by 66 days.

(21) Appl. No.: 18/766,046

(22) Filed: Jul. 8, 2024

(65) Prior Publication Data

US 2025/0019977 A1 Jan. 16, 2025

(30) Foreign Application Priority Data

Jul. 11, 2023 (FR) ....................................... 2307451

(51) Int. Cl.
*B32B 7/12* (2006.01)
*B32B 5/02* (2006.01)
(Continued)

(52) U.S. Cl.
CPC ............ *E04F 15/107* (2013.01); *B32B 5/024* (2013.01); *B32B 7/12* (2013.01); *B32B 27/065* (2013.01); *B32B 27/12* (2013.01); *B32B 27/304* (2013.01); *B32B 2250/05* (2013.01); *B32B 2266/0235* (2013.01); *B32B 2307/412* (2013.01);
(Continued)

(58) Field of Classification Search
CPC ....... B32B 7/12; B32B 27/12; B32B 2471/00; E04F 15/107
See application file for complete search history.

(56) References Cited

U.S. PATENT DOCUMENTS

2019/0263307 A1* 8/2019 Jaudouin .............. D06N 7/0049
2024/0034034 A1* 2/2024 Cinausero ............... B32B 5/024

FOREIGN PATENT DOCUMENTS

BE 1027650 * 5/2021
EP 3 530 451 A1 8/2019
(Continued)

OTHER PUBLICATIONS

French Search Report for Application No. FR 2307451 dated Feb. 6, 2024.

*Primary Examiner* — Elizabeth E Mulvaney
(74) *Attorney, Agent, or Firm* — MARSHALL, GERSTEIN & BORUN LLP

(57) ABSTRACT

A multilayer structure for creating a floor covering includes at least one surface layer bonded to a backing layer, both the surface layer and the backing layer being made of PVC. The multilayer structure successively includes, from top to bottom, between the surface layer and the backing layer, a first woven reinforcement, an intermediate layer, a second woven reinforcement, all bonded to each other, to the surface layer, and to the backing layer by means of bonding layers in the form of thermofusible films, for example, copolyamide or copolyester, or cross-linked polyurethane adhesive layers. The multilayer structure has a surface mass between 2000 and 3000 g/m$^2$. The intermediate layer and the backing layer are made of PVC and each include:

- a thickness between 100 μm and 200 μm;
- between 5 and 25 phr of plasticizer, preferably between 6 and 15 phr of plasticizer.

15 Claims, 3 Drawing Sheets

(51) Int. Cl.
*B32B 27/06* (2006.01)
*B32B 27/12* (2006.01)
*B32B 27/30* (2006.01)
*E04F 15/10* (2006.01)

(52) U.S. Cl.
CPC ..... *B32B 2307/546* (2013.01); *B32B 2307/72* (2013.01); *B32B 2307/7376* (2023.05); *B32B 2471/00* (2013.01)

(56) References Cited

FOREIGN PATENT DOCUMENTS

| | | | |
|---|---|---|---|
| FR | 3 091 831 | A1 | 7/2020 |
| FR | 3 112 096 | A1 | 1/2022 |

* cited by examiner

MULTILAYER STRUCTURE FOR THE CREATION OF REINFORCED AND RECYCLABLE FLOORING

TECHNICAL FIELD

The invention relates to the technical field of flexible floor coverings, preferably presented in rolls or as a welded and adhesive kit.

The invention concerns a multilayer structure for the creation of a reinforced and recyclable floor covering.

The invention finds advantageous application in covering honeycomb airplane floor panels, for example.

BACKGROUND ART

It is well known in the prior art to use a multilayer structure for creating a floor covering, which includes a surface layer bonded to a backing layer, known as a "laminated" backing layer, used for covering airplane floors, for example.

In this type of structure, the laminated backing layer consists of a woven fiberglass reinforcement impregnated with phenolic or polyester resins. This backing layer ensures the adherence of the floor covering to its support, provides dimensional stability, blocks the migration of plasticizers from the PVC surface layers, improves impact resistance, and reduces the "telegraphing" phenomenon, which is the transmission of substrate irregularities to the floor covering. Another important aspect of a floor covering used for airplane floors is its ability to resist floor deformations during flight, which can cause buckling.

The laminated backing layer is complex to manufacture and requires technical expertise possessed by only a few companies, resulting in high production costs.

Another disadvantage of this laminated backing layer is that it is not recyclable due to the use of phenolic resin. Currently, this type of layer is typically ground up and discarded.

Documents US2010/0227132 and EP3064347 describe multilayer structures for creating floor coverings where the backing layer comprises a composite material including woven or non-woven reinforcement fibers and a thermosetting or thermoplastic polymer resin, chosen from the group including polyester resin, phenolic resin, epoxy resin, polysulfone, vinyl ester resin, epoxy-acrylic resin, and their mixtures.

The resulting disadvantage is that using a thermosetting resin affects the recyclability of the floor covering.

Replacing the phenolic resin with a thermoplastic resin can also affect recyclability, as the structure becomes too heterogeneous. Additionally, the expected performance of the multilayer structure, such as weldability between two structures or traffic resistance, is not achieved.

SUMMARY OF THE INVENTION

One of the aims of the invention is to overcome the disadvantages of the prior art by proposing a multilayer structure, for example, used for covering airplane floors, with a backing layer whose manufacturing cost is lower than that of laminated layers, and to provide a multilayer structure that fully satisfies in terms of floor covering adherence to its support, dimensional stability, and impact resistance.

Another objective of the invention is to provide such a multilayer structure with improved recyclability and limited weight.

Another objective of the invention is to provide such a multilayer structure with telegraphing and buckling resistance comparable to or better than existing solutions.

To this end, a multilayer structure for creating a floor covering has been developed, comprising at least one surface layer bonded to a backing layer, both the surface layer and the backing layer being made of PVC.

According to the invention, the multilayer structure successively includes, from top to bottom, between the surface layer and the backing layer, a first woven reinforcement, an intermediate layer, and a second woven reinforcement, all bonded to each other, to the surface layer, and to the backing layer by means of bonding layers in the form of thermofusible films, for example, copolyamide or copolyester, or layers of cross-linked polyurethane adhesive. The multilayer structure has a surface mass between 2000 and 3000 g/m$^2$, and the intermediate layer and the backing layer are made of PVC and each include:

- a thickness between 100 μm and 200 μm;
- between 5 and 25 parts per hundred resin (phr) of plasticizer, preferably between 6 and 15 phr of plasticizers.

The woven reinforcements improve the rigidity and dimensional stability of the multilayer structure.

The amount of plasticizer is directly related to the amount of flame retardant needed in the composition since plasticizers are flammable compounds. Limiting the amount of plasticizer between 5 and 25 phr reduces the amount of flame retardant needed or even eliminates the need for it, limits plasticizer migration into double-sided adhesives typically used to bond the multilayer structure to a honeycomb airplane floor, for example, and thus prevents the degradation of these adhesives' adhesion properties over time. An amount of plasticizer in the intermediate and backing layers between 6 and 15 phr provides a better compromise between the structure's rigidity, weight, and handling ease for installation.

The multilayer structure according to the invention thus has intermediate and backing layers, providing a floor covering with relatively low manufacturing costs, which fully satisfies in terms of adherence to its support, dimensional stability, heat curvature, and impact resistance. Since the surface layer, intermediate layer, and backing layer are all made of PVC, the recyclability of the multilayer structure becomes feasible.

Preferably, the backing layer and/or the intermediate layer are made of PVC and have a flexural resistance, measured according to ISO 2493-2, between 0.3 mN.m and 1.5 mN.m to limit telegraphing effects and provide sufficient rigidity to the structure.

According to a particular embodiment, the surface layer includes a top layer, particularly a wear layer, and one or more interlayers made of plasticized PVC.

For example, the top layer is transparent, and a first interlayer is directly placed under the surface layer and may take the form of a film printed with a design. In this case, a second interlayer, non-transparent, is preferably placed under the printed film to ensure sufficient opacity.

The surface, interlayer, intermediate, and backing layers are preferably made by calendering, pressing, coating, or extrusion to form a relatively smooth layer with homogeneous composition throughout its thickness.

According to a particular embodiment, the first and/or second woven reinforcement can be impregnated with a thermoplastic or thermosetting polymer in an amount between 1% and 10% by weight of each impregnated woven reinforcement to maintain recyclability. This provides the multilayer structure with greater rigidity. The thermoplastic or thermosetting polymer can be chosen from the group including polyurethane resin, polyester resin, phenolic resin, epoxy resin, polysulfone, vinyl ester resin, epoxy-acrylic resin, and their mixtures.

Preferably, to improve resistance to the phenomenon known to those skilled in the art as "telegraphing," a foamed layer, preferably made of PVC, is bonded to the lower face of the backing layer by means of a bonding layer in the form of a cross-linked polyurethane (PUR) layer, a thermoplastic copolyester (CoPES) layer, copolyamide, or thermoplastic polyurethane (TPU) layer.

This foamed layer advantageously has a density between 0.15 and 0.25, preferably between 0.20 and 0.25, and a thickness between 1.5 and 3 mm, preferably between 1.9 and 2.5 mm, to provide good telegraphing resistance without reducing the indentation resistance of the multilayer structure.

Advantageously, this foamed layer includes a third reinforcement impregnated at least partially in its thickness to improve the foamed layer's resistance and the overall multilayer structure. The third reinforcement impregnated at least partially in the thickness of the foamed layer can be a non-woven textile layer, preferably a fiberglass or polyester web, a reinforcement grid, preferably a fiberglass or polyester grid, or a composite comprising a non-woven textile layer bonded to a reinforcement grid.

Advantageously, this foamed layer includes a fourth reinforcement impregnated at least partially in its thickness to improve the telegraphing resistance of the overall multilayer structure. The fourth reinforcement impregnated at least partially in the thickness of the foamed layer can be a non-woven textile layer, preferably a fiberglass or polyester web, or a composite comprising a non-woven textile layer bonded to a reinforcement grid, preferably a fiberglass or polyester grid. The fourth reinforcement advantageously has a lower face intended to be bonded to a support such as an airplane floor. Alternatively, the fourth reinforcement advantageously has a lower face bonded to a double-sided adhesive to bond the multilayer structure to a support such as an airplane floor.

Advantageously, to facilitate the installation of the multilayer structure according to the invention, the multilayer structure includes a repositionable adhesive layer on a lower face intended to be in contact with the floor, that is, directly on the lower face of the backing layer, which adheres more to the multilayer structure than to the floor to allow the multilayer structure to be peeled off and repositioned.

DETAILED DESCRIPTION OF THE INVENTION

Figure 1:
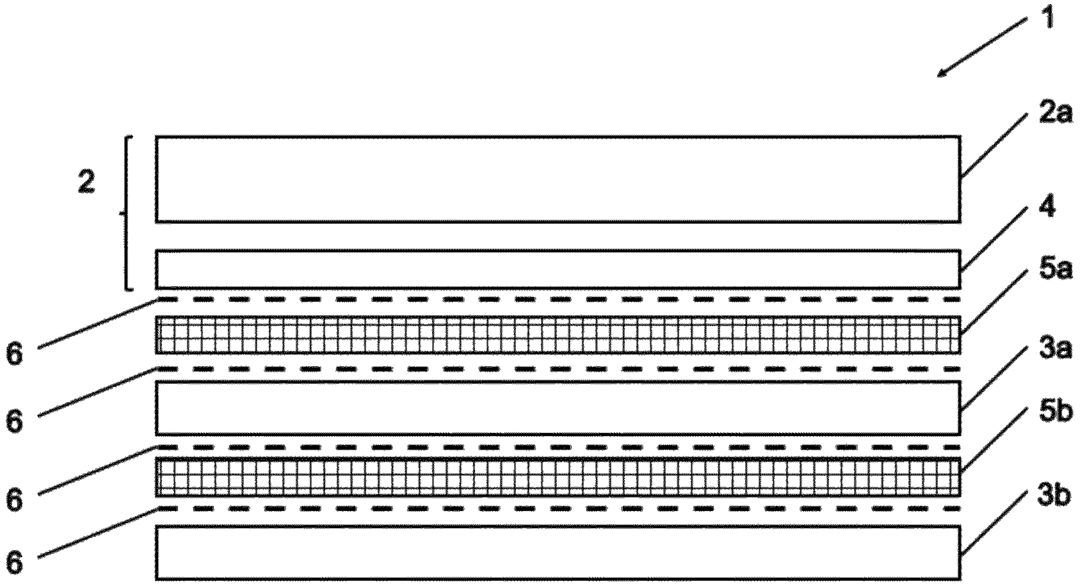
FIG. 1 illustrates in section a multilayer structure according to a first embodiment of the invention, with a top layer, an interlayer, a first woven reinforcement, an intermediate layer, a second woven reinforcement, and a backing layer.

Referring to FIGS. 1 to 4, the invention concerns a multilayer structure (1) for creating a floor covering, preferably for covering airplane floors, for example, honeycomb floors, without being limited to this application.

The multilayer structure (1) according to the invention has a low manufacturing cost while possessing optimal performance in terms of adherence to its support, dimensional stability, impact resistance, and recyclability.

To this end, the multilayer structure (1) according to the invention includes at least one surface layer (2) made of PVC, bonded to a backing layer (3*b*), also made of PVC.

According to the invention, the multilayer structure (1) has a surface mass between 2000 and 3000 g/m$^2$, preferably between 2100 and 2600 g/m$^2$, and successively from top to bottom, between the surface layer (2) and the backing layer (3*b*), a first woven reinforcement (5*a*), an intermediate layer (3*a*), a second woven reinforcement (5*b*), all bonded to each other, to the surface layer (2), and to the backing layer (3*b*) by means of bonding layers (6) in the form of thermofusible films, for example, copolyamide, thermoplastic polyurethane, or copolyester, or layers of cross-linked polyurethane adhesive.

The intermediate layer (3*a*) and the backing layer (3*b*) are each made of PVC and include:

- a thickness between 100 μm and 200 μm;
- between 5 and 25 parts per hundred resin (phr) of plasticizer, preferably between 6 and 15 phr of plasticizer, where "phr" means parts per hundred resin, referring to the PVC of the intermediate (3*a*) and backing (3*b*) layers;
- preferably a flexural resistance, particularly the B flexure of PVC films measured according to ISO 2493-2 on a "Taber Stiffness" test bench from "Taber Industries," model "TABER 150-E," between 0.30 mN.m and 1.5 mN.m.

A bonding layer (6) typically has a thickness between 10 and 100 μm, preferably between 10 and 50 μm.

Each intermediate and/or backing layer may contain no fillers or optionally include a quantity of fillers between 1 and 50 phr. The fillers can be chosen from the group including calcium carbonate, chalks, kaolin, talc, silica. Each intermediate and/or backing layer may also contain at least one additive chosen from the following group: thermal stabilizers, desiccants, lubricants, processing aids, pigments, flame retardants.

Limiting the amount of plasticizer prevents plasticizer migration into double-sided adhesives typically used to bond the multilayer structure (1) to a floor, avoiding the degradation of the adhesives' adhesion properties over time.

Flexural resistance is tested in the machine direction, determined as the average bending moment of 10 measured values, i.e., 5 bending movements in one direction and 5 bending movements in the opposite direction.

The resulting multilayer structure (1) thus has a low weight, limiting its impact on the fuel consumption of a vehicle carrying it while meeting the mechanical constraints of such applications, particularly in terms of telegraphing and buckling resistance.

Figure 2:
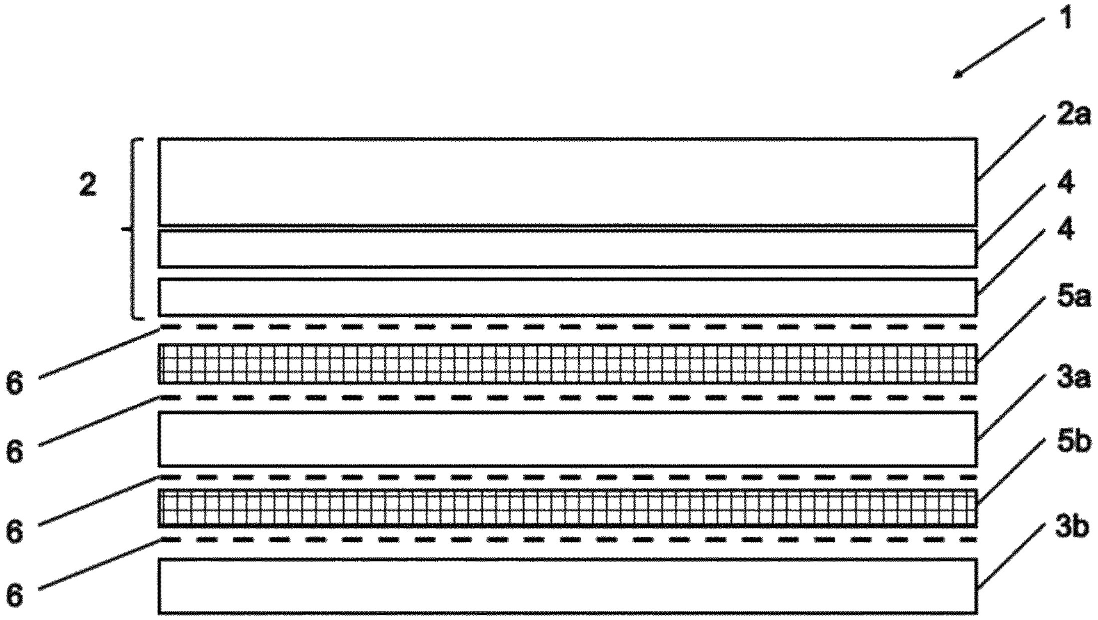
FIG. 2 is a view similar to FIG. 1, with two interlayers.

The surface layer (2) may include a top layer (2*a*), particularly a wear layer, and one, see FIG. 1, or more, see FIG. 2, interlayers (4) made of plasticized PVC, for example, with a plasticizer content greater than 15 phr, preferably less than 40 phr. Each interlayer may contain no fillers or optionally include a quantity of fillers between 1 and 150 phr. The fillers can be chosen from the group including calcium carbonate, chalks, kaolin, talc, silica. Each interlayer may also contain at least one additive chosen from the following group: thermal stabilizers, desiccants, lubricants, processing aids, pigments, flame retardants.

The top layer (2*a*) and the interlayers (4) are bonded together, for example, by complexing, i.e., hot lamination. For example, the top layer (2*a*) preferably has a thickness between 0.35 mm and 0.55 mm, and each interlayer (4) preferably has a thickness between 0.15 mm and 0.60 mm.

The top layer (2*a*) is plasticized and optionally filled, and may optionally have a surface varnish well known to those skilled in the art, to ensure easy maintenance. It may also contain at least one additive chosen from the following group: UV thermal stabilizers, desiccants, lubricants, processing aids, pigments, flame retardants.

According to a particular embodiment, the top layer (2*a*) is transparent to visible light for the human eye, and the interlayer (4), directly placed under the top layer (2*a*), may take the form of a film printed with a design on its side facing the top layer (2*a*). In this case, it is preferable to place a second interlayer (4), non-transparent, under the printed film to ensure sufficient opacity for the design and avoid seeing the structure of the first woven reinforcement (5*a*). Alternatively, a design can be directly printed on the back of the top layer, facing the interlayer (4).

The first and second woven reinforcements (5*a*, 5*b*) improve the rigidity and dimensional stability of the multilayer structure (1) and may take the form of a glass fabric.

Due to the lack of affinity of the woven reinforcements (5*a*, 5*b*) with PVC, these woven reinforcements (5*a*, 5*b*) are bonded to the surface layer (2), the intermediate layer (3*a*), and the backing layer (3*b*) by means of bonding layers (6), for example, in the form of thermofusible films, (for example, copolyamide CoPA, thermoplastic polyurethane TPU, or thermoplastic copolyester CoPES), layers of cross-linked polyurethane PUR, applied as an adhesive well known to those skilled in the art as "hotmelt."

The first and/or second reinforcements (5*a*, 5*b*) are preferably woven in a plain weave, without limitation. A twill or satin weave could also be considered.

The first and/or second woven reinforcements (5*a*, 5*b*) are preferably made from fiberglass, polyamide fibers, or polyester fibers.

The fiberglass may have a weight between 22 Tex and 68 Tex. The polyester fibers may have a weight of about 1100 dtex. The polyamide fibers may have a weight between 44 dtex and 78 dtex. The first and/or second woven reinforcements (5*a*, 5*b*) typically have a thickness between 150 μm and 300 μm, preferably between 165 μm and 205 μm. The first and/or second woven reinforcements (5*a*, 5*b*) typically have a surface mass between 150 and 300 g/$m^2$, although this value depends on the nature of the fibers used.

When the first and/or second woven reinforcement (5*a*, 5*b*) is made from fiberglass, it has a warp thread count between 17 and 18 threads per cm and a weft thread count between 13.5 and 14 threads per cm.

Below 17 warp threads per cm or 13.5 weft threads per cm, the first and/or second woven reinforcement (5*a*, 5*b*) becomes porous, especially with a weight between 22 and 68 Tex.

Preferably, the first and/or second woven reinforcements (5*a*, 5*b*) are impregnated with a thermoplastic or thermosetting polymer in an amount between 1% and 10% by weight of the impregnated woven reinforcement to maintain recyclability, provide greater rigidity, and limit or eliminate glue penetration that could clog the lamination line during the layer assembly process.

The thermosetting or thermoplastic polymer used to impregnate the first and/or second woven reinforcement can be chosen from the group including polyurethane resin, polyester resin, phenolic resin, epoxy resin, polysulfone, vinyl ester resin, epoxy-acrylic resin, and their mixtures.

Figure 3:
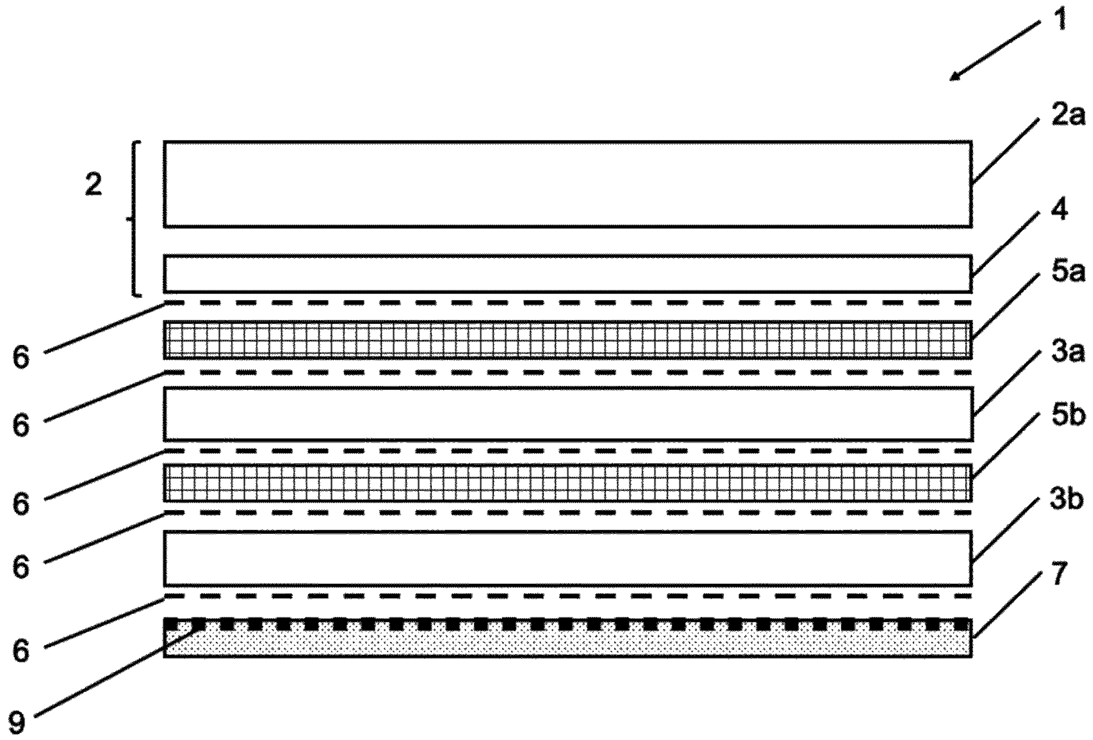
FIG. 3 is a view similar to FIG. 1, with a foamed layer on the lower face of the backing layer, including a third reinforcement impregnated at least partially in its thickness.
Figure 4:
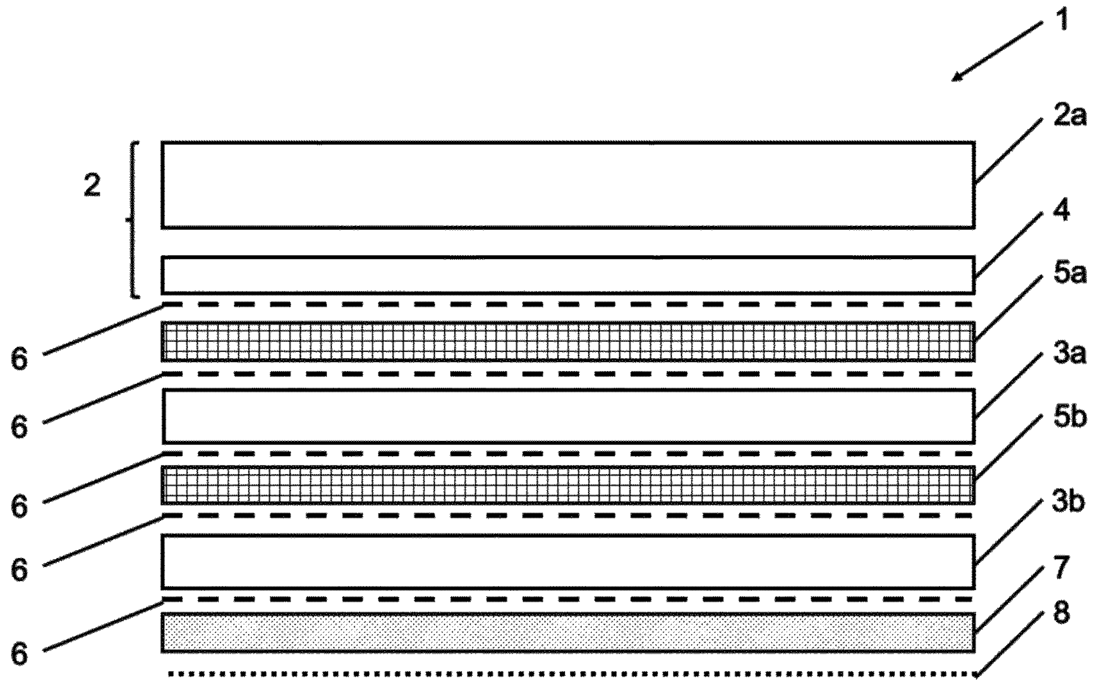
FIG. 4 is a view similar to FIG. 1, with a foamed layer on the lower face of the backing layer and a repositionable adhesive in contact with the floor.

Preferably, and with reference to FIGS. 3 and 4, to improve resistance to phenomena known to those skilled in the art as "telegraphing" and "buckling," also called "waving," a foamed layer (7) is bonded to the lower face of the backing layer (3) by means of a bonding layer (6) in the form of "hotmelt" adhesive, for example, polyurethane PUR or copolyester "CoPES."

The foamed layer (7) advantageously has a density between 0.15 and 0.25, preferably between 0.20 and 0.25, and a thickness between 1.5 and 3 mm, preferably between 1.9 and 2.5 mm, to improve resistance to telegraphing and buckling (or waving).

Preferably, and with reference to FIG. 3, the foamed layer (7) includes a third reinforcement (9) impregnated at least partially in its thickness to improve the foamed layer's (7) resistance and the overall multilayer structure. The third reinforcement (9) can be a non-woven textile layer, preferably a fiberglass, cellulose, or polyester web, alone or in a mixture, a reinforcement grid, preferably a fiberglass or polyester grid, or a composite comprising a non-woven textile layer bonded to a reinforcement grid. The non-woven textile layer of the third reinforcement (9) typically has a weight between 20 and 80 g/$m^2$. The grid of the third reinforcement (9) typically has a weave density greater than 2×2 and a warp and weft thread count between 34 and 68 tex. The third reinforcement may optionally include a binder such as PVAc (polyvinyl acetate). The foamed layer can be obtained from a PVC plastisol coated on the third reinforcement (9) and then gelled to impregnate at least partially in its thickness the said reinforcement. Preferably, the third reinforcement (9) is positioned relative to the backing layer (3*b*) and bonded to the said backing layer (3*b*) by a bonding layer (6).

Preferably, and with reference to FIG. 4, the multilayer structure (1) includes a repositionable double-sided adhesive (8) on a lower face intended to be in contact with the floor, that is, for example, directly on the lower face of the backing layer (3), or the lower face of the non-woven textile layer, which adheres more to the multilayer structure (1) than to the floor to facilitate installation.

Figure 5:
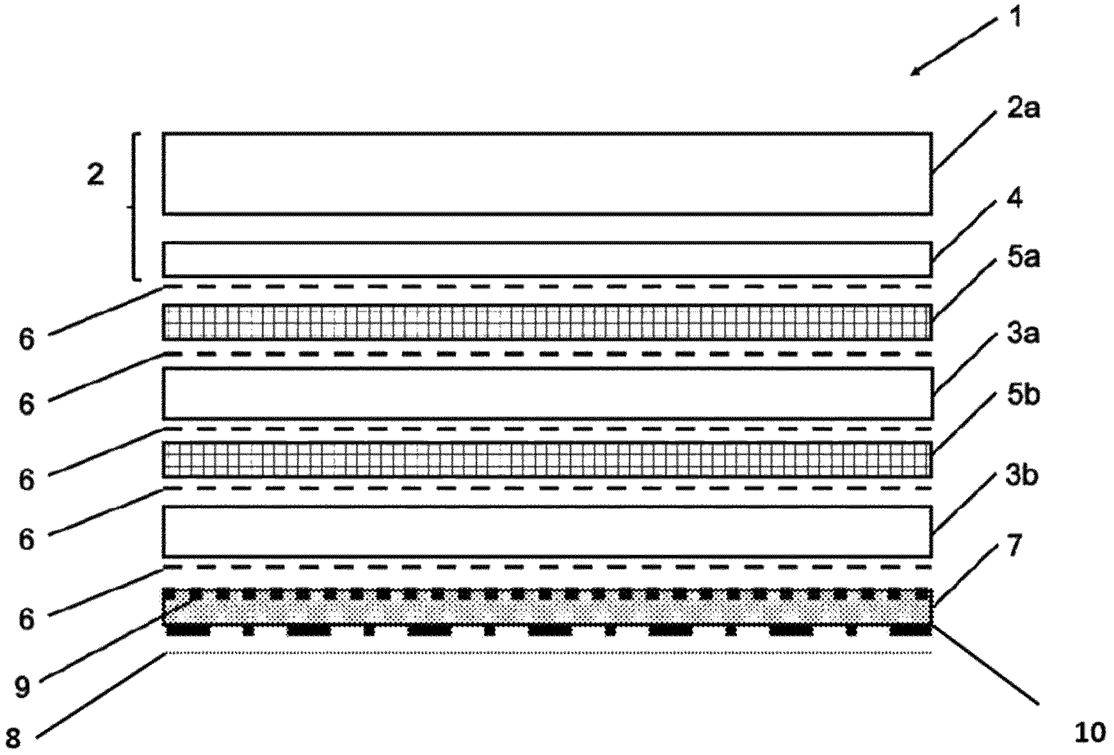
FIG. 5 is a view similar to FIG. 3, with a fourth reinforcement on the lower face of the foamed layer and optionally a repositionable adhesive in contact with the floor.

Preferably, and with reference to FIG. 5, a fourth reinforcement (10) is bonded to the lower face of the foamed layer (7) and impregnated at least partially in its thickness to improve the telegraphing resistance of the overall multilayer structure. The fourth reinforcement (9) can be a non-woven textile layer, preferably a fiberglass, cellulose, or polyester web, alone or in a mixture, or a composite comprising a non-woven textile layer bonded to a reinforcement grid, preferably a fiberglass or polyester grid. The non-woven textile layer of the fourth reinforcement (10) typically has a weight between 80 g/$m^2$ and 150 g/$m^2$ if alone and between 20 g/$m^2$ and 150 g/$m^2$ in a composite. When using a composite for the fourth reinforcement (10), the grid of the composite typically has a weave density greater than 2×2 and a warp and weft thread count between 34 and 68 tex. The fourth reinforcement may optionally include a binder such as PVAc (polyvinyl acetate). The foamed layer (7) can be obtained from a PVC plastisol coated on the third reinforcement (9) on which the fourth reinforcement (10) is then placed. The plastisol is then gelled to impregnate at least partially in their thicknesses the third and fourth reinforcements (9, 10).

The Applicant has conducted tests on a product A compliant with the invention; Product A, with a surface mass of 2150 g/m$^2$, includes:

a top layer (2*a*) made of plain PVC, 0.50 mm thick, with a surface mass of 640 g/m$^2$;

an interlayer (4) made of PVC, 0.50 mm thick, with a surface mass of 640 g/m$^2$;

a bonding layer (6) in the form of a thermofusible film 0.045 mm thick, with a surface mass of 50 g/m$^2$;

a first impregnated woven reinforcement (5*a*) with a thickness of 0.15 mm and a surface mass of 223 g/m$^2$;

a bonding layer (6) in the form of a cross-linked polyurethane adhesive with a surface mass of 35 g/m$^2$;

an intermediate layer (3*a*) made of plasticized PVC with 8 phr and 140 μm thickness, with a flexural resistance measured according to ISO 2493-2 of 0.35 mN.m;

a bonding layer (6) in the form of a cross-linked polyurethane adhesive with a surface mass of 35 g/m$^2$;

a second impregnated woven reinforcement (5*b*) with a thickness of 0.15 mm and a surface mass of 223 g/m$^2$;

a bonding layer (6) in the form of a cross-linked polyurethane adhesive with a surface mass of 35 g/m$^2$;

a backing layer (3*b*) made of plasticized PVC with 8 phr and 140 μm thickness, with a flexural resistance measured according to ISO 2493-2 of 0.35 mN.m.

TABLE 1

| Characteristics | Standards | Requirements | Results |
|---|---|---|---|
| Surface mass | ISO 2286-2 | 2100 +/− 150 g/m2 | 2150 g/m2 |
| Thickness | ISO 2286-3 | <3.7 mm | 1.75 mm |
| Compression force - longitudinal (L) | ISO 604 | >80N | 110N |
| Compression force - transverse (T) | ISO 604 | >80N | 90N |
| $E_fh^3$ (≈flexural moment) - longitudinal (L) | ISO 178 | >1500 N · mm | 1970 N · mm |
| $E_fh^3$ (≈flexural moment) - transverse (T) | ISO 178 | >1500 N · mm | 1540 N · mm |
| Vertical flammability test 12 s | FAR 25.853 | compliant | YES |
| Peel resistance (between reinforcement layers) | ISO 4578 | >12N/ 25 mm | 110N/ 25 mm |
| Recyclability | | | OUI |
| Dimensional stability (70° C. for 168 h) | ISO 23999 | +/−0.2% | 0.05% |
| Heat curvature (70° C. for 168 h) | ISO 23999 | <10 mm | 1 mm |
| Peel resistance between the backing layer (3b) of the product and a double-sided adhesive marketed by 3M under reference 3M950 | ISO 4578 | >20N/ 25 mm | 30N/ 25 mm |

In this Table 1, we observe that product A meets all requirements in terms of surface mass, thickness, compression force, flexural moment, flammability, and peel resistance. Furthermore, recyclability is improved compared to existing solutions. Dimensional stability, heat curvature, and adherence to the support (peel resistance) are also satisfactory.

A second series of tests was conducted on product B. Product B complies with the invention and includes the characteristics and different layers of product A, with the addition of a foamed layer (7) bonded to the backing layer (3*b*) by means of a bonding layer (6) in the form of a cross-linked polyurethane adhesive with a surface mass of 35 g/m$^2$, according to FIG. 4.

The foamed layer (7) includes a third reinforcement (9) with a thickness of 150 μm, partially impregnated in its thickness and in the form of a composite comprising a non-woven textile layer made of cellulose and polyester fibers with a weight of 20 g/m$^2$ bonded to a fiberglass reinforcement grid by a PVAc binder, with a weave density of 5×3 and a warp and weft thread count of 34 tex by 34 tex.

The foamed layer is obtained from a PVC plastisol coated on the third reinforcement (9) and then gelled to impregnate at least partially in its thickness the said reinforcement.

Different types of foamed layers (7) are tested, varying their densities, surface masses, and thicknesses. The telegraphing resistance test consists of visually observing the appearance of substrate defects on the surface of the multilayer structure (1).

The results are graded between: no apparent defect (+++), apparent but acceptable defect (++), apparent and unacceptable defect (+). The buckling resistance test consists of visually observing the appearance of bumps on the surface of the multilayer structure (1). The results are graded between: no apparent bump (+++), apparent but acceptable bump (++), apparent unacceptable bump (+).

TABLE 2

| Foamed layer (7) | | | | | |
|---|---|---|---|---|---|
| Density | Surface mass (g/m$^2$) | Thickness (mm) | Telegraphing | Buckling | Indentation (NF EN ISO 24343-1) |
| 0.17 | 400 | 2.4 | +++ | ++ | 0.7 mm |
| 0.17 | 350 | 2 | ++ | ++ | 0.5 mm |
| 0.23 | 400 | 1.75 | + | ++ | 0.2 mm |
| 0.23 | 450 | 1.95 | ++ | ++ | 0.2 mm |
| 0.23 | 500 | 2.2 | ++ | ++ | 0.3 mm |

In this Table 2, we observe that a foamed layer (7) with a density between 0.20 and 0.35 and a thickness between 1.9 and 2.5 provides the best compromise between the indentation resistance of the multilayer structure (1) and its telegraphing and buckling resistance. This solution is therefore preferable.

A third series of tests was conducted on two variants of product C. Product C complies with the invention and includes the characteristics and different layers of product B, with the addition of a fourth reinforcement (10) bonded to the lower face of the foamed layer (7) and impregnated in part in its thickness, as well as a repositionable double-sided adhesive layer (8) bonded to the lower face of the fourth reinforcement (10). Different reinforcements are tested, compared to product B, which also has a repositionable double-sided adhesive layer (8) bonded to the lower face of the foamed layer (7).

The foamed layer (7) in these two products in this third series of tests is obtained from a PVC plastisol with a density of 0.23, a surface mass of 450 g/m$^2$, and a thickness of 2 mm.

The fourth reinforcement (10) is either a composite or a non-woven fabric.

In the first variant of product C, the composite includes a non-woven textile layer made of cellulose and polyester fibers with a weight of 20 g/m$^2$ bonded to a fiberglass reinforcement grid by a PVAc (Polyvinyl Acetate) binder, with a weave density of 5×3 and a warp and weft thread count of 34 tex by 34 tex.

In the second variant of product C, the non-woven fabric is made of polyester and has a surface mass of 80 g/m$^2$.

A repositionability test according to Boeing BMS 8-434 8.11 is conducted for the same double-sided adhesive (8). The objective is to obtain a peel resistance value greater than 1.5 lb/2 inch.

TABLE 3

| | | Boeing BMS 8-434 8.11 repositionability test (lb/2 inch) | | | |
|---|---|---|---|---|---|
| | Reinforcement layer (10) | 1st positioning | 2nd positioning | 3rd positioning | 4th positioning at 24 hr |
| Product B | No | 2.58 | 2.28 | 2.26 | 2.92 |
| Product C, 1st variant | Composite | 2.36 | 2.46 | 2.27 | 2.87 |
| Product C, 2nd variant | Non-woven | 2.22 | 1.95 | 2.05 | 2.66 |

The repositionability test shows that adding a fourth reinforcement layer (10) does not degrade the repositionability properties of product C. A telegraphing resistance test is conducted by comparing the multilayer structure according to the invention with two commercial products "Batiflex AV135" and "Batiflex AVM 282," which do not include a third reinforcement in combination with a foamed layer (7). The test consists of placing metal balls with diameters of 1, 1.5, and 2 mm, as well as a 0.2 mm thick strip between a flat substrate and the adhesive floor covering on the substrate. Then, exposing the covering to raking light, a rating from 1 to 5 is given to characterize the visibility of the ball or strip on the surface of the covering. The higher the rating, the more visible the ball or strip is, the objective being to mask these defects as much as possible.

TABLE 4

| | | Telegraphing tests | | | |
|---|---|---|---|---|---|
| | Reinforcement layer (10) | 1 mm ball | 1.5 mm ball | 2 mm ball | 0.2 mm strip |
| Batiflex AV 135 | No | 5 | 5 | 5 | 5 |
| Batiflex AVM 282 | No | 2 | 3 | 4 | 5 |
| Product B | No | 1 | 2 | 3 | 2 |
| Product C | Non-woven | 1 | 2 | 2 | 1 |

The tests show an improvement in the invention's telegraphing resistance compared to the "Batiflex AV135" and "Batiflex AVM282" floor coverings for airplane floor panels. The 1 mm balls are completely masked, and the surface defects of the other objects are significantly reduced. A trolley test according to Boeing BMS 8-434 8.2 is conducted between product B and the 2nd variant of product C, which includes a fourth reinforcement (10) non-woven 80 g/m$^2$ polyester layer. The objective is not to observe any delamination of the multilayer structure (1), particularly of the foamed layer (7), after 20000 trolley cycles. This test shows initial delamination for product B after 20000 cycles, while product C shows no delamination. The presence of a fourth reinforcement (10) improves the delamination resistance of a structure according to the invention that includes a foamed layer (7).

The invention claimed is:

1. A multilayer structure for creating a floor covering, comprising at least one surface layer bonded to a backing layer, both the surface layer and the backing layer being made of PVC; wherein the multilayer structure successively includes, from top to bottom, between the surface layer and the backing layer, a first woven reinforcement, an intermediate layer, a second woven reinforcement, all bonded to each other, to the surface layer, and to the backing layer by means of bonding layers in the form of thermofusible films, or cross-linked polyurethane adhesive layers; and wherein the multilayer structure has a surface mass between 2000 and 3000 g/m$^2$, and wherein the intermediate layer and the backing layer are made of PVC and each include:

a thickness between 100 μm and 200 μm;

between 5 and 25 phr of plasticizer.

2. A multilayer structure according to claim 1, wherein the intermediate layer and/or the backing layer include a flexural resistance measured according to ISO 2493-2 between 0.30 mN.m and 1.5 mN.m.

3. A multilayer structure according to claim 1, wherein the surface layer includes a top layer and one or more interlayers made of plasticized PVC.

4. A multilayer structure according to claim 3, wherein the top layer is transparent and the interlayer directly placed under the top layer is a film printed with a design.

5. A multilayer structure according to claim 1, wherein the first woven reinforcement and/or the second woven reinforcement are impregnated with a thermoplastic or thermosetting polymer in an amount between 1% and 10% by weight of the impregnated woven reinforcement.

6. A multilayer structure according to claim 1, wherein a foamed layer is bonded to a lower face of the backing layer by means of a bonding layer in the form of thermofusible films or cross-linked polyurethane adhesive layer.

7. A multilayer structure according to claim 6, wherein the foamed layer has a density between 0.15 and 0.25, and a thickness between 1.5 and 3 mm.

8. A multilayer structure according to claim 6, wherein the foamed layer includes a third reinforcement impregnated at least partially in its thickness.

9. A multilayer structure according to claim 8, wherein the foamed layer includes a fourth reinforcement impregnated at least partially in its thickness.

10. A multilayer structure according to claim 1, further comprising on a lower face intended to be in contact with the floor, a repositionable double-sided adhesive layer.

11. A multilayer structure according to claim 1, wherein means of bonding layers in the form of thermofusible films are in copolyamide or copolyester.

12. A multilayer structure according to claim 1, wherein the intermediate layer and the backing layer include each between 6 and 15 phr of plasticizer.

13. A multilayer structure according to claim 6, wherein the foamed layer is made of PVC.

14. A multilayer structure according to claim 1, wherein the density of the foamed layer is between 0.20 and 0.25.

15. A multilayer structure according to claim 1, wherein the thickness of the foamed layer is between 1.9 and 2.5 mm.

* * * * *